United States Patent [19]

Heaney

[11] 3,858,224
[45] Dec. 31, 1974

[54] EXPOSURE CONTROL DEVICE FOR A PHOTOGRAPHIC CAMERA

[75] Inventor: Paul R. Heaney, Rochester, N.Y.

[73] Assignee: Eastman Kodak Company, Rochester, N.Y.

[22] Filed: Nov. 29, 1973

[21] Appl. No.: 420,182

[52] U.S. Cl. ............... 354/42, 352/141, 354/43, 354/60, 354/271
[51] Int. Cl. ............... G03b 7/08, G03b 9/02
[58] Field of Search .......... 354/42, 43, 44, 271, 60; 352/141

[56] References Cited
UNITED STATES PATENTS

| | | | |
|---|---|---|---|
| 1,934,484 | 11/1933 | Camilli | 352/141 |
| 3,299,789 | 1/1967 | Chandler et al. | 354/42 |
| 3,324,777 | 6/1967 | Kanner | 354/43 |
| 3,426,662 | 2/1969 | Sevin | 354/43 |
| 3,427,941 | 2/1969 | Metzger | 354/42 |
| 3,483,807 | 12/1969 | Biedermann et al. | 354/43 |
| 3,611,894 | 10/1971 | Minneste, Jr. | 354/43 |

*Primary Examiner*—Joseph F. Peters, Jr.
*Attorney, Agent, or Firm*—D. P. Monteith

[57] ABSTRACT

A photographic camera includes exposure control apparatus of the null-position type having a light regulating member driven by a light sensitive trigger circuit from a light blocking position to a light unblocking position. A spring member coupled to the light regulating member applies a continuous bias force in a direction opposite to the drive force to enable the light regulating member to be positioned in its proper light unblocking position. Further, the spring member causes the light regulating member to maintain the trigger circuit in a darkened condition during time intervals the circuit is de-energized so that a more accurate exposure control response time is effected when the camera is actuated.

4 Claims, 8 Drawing Figures

EXPOSURE CONTROL DEVICE FOR A PHOTOGRAPHIC CAMERA

BACKGROUND OF THE INVENTION

1. Field of the Invention

This invention relates to photographic cameras, and more particularly to automatic exposure control apparatus for controlling such cameras.

2. Description of the Prior Art

The exposure of film in a camera may be regulated automatically by adjusting an aperture as a function of scene brightness. It has been common practice to employ a galvanometer for moving one or more diaphragm blades as a function of the intensity of scene light as monitored by a photovoltaic cell coupled to the galvanometer. Also, instead of using a photovoltaic cell, it is well known to use a battery connected in series with a photoresistive cell. In systems of this type problems may be encountered in closely matching the closing characteristic of the diaphragm to the sensitivity of the cell at various levels of illumination.

To overcome this problem, "null" type systems have been used in which a servo mechanism simultaneously controls apertures masking both the photocell and the camera's taking lens. Generally, such systems are designed so that the apertures are fully open when the photocell is exposed to the minimum intensity of light required to make an acceptably exposed photograph. When the light intensity increases, the apertures masking both the photocell and the film are simultaneously closed until the intensity of light reaching the photocell is reduced to the calibrated level, i.e., to the minimum level for acceptable film exposure. In some prior art devices of this general "null" type, the galvanometer has no return spring but instead has two oppositely poled coils for controlling the aperture forming diaphragms, one tending to close the aperture and the other tending to open it.

Although these "null" type systems are more satisfactory than the other exposure control systems referred to hereinabove, they like most automatic exposure control systems, suffer the disadvantage that the bearing surfaces of the mechanism tend to "lock up" due to static friction. Such friction problems tend to reduce accuracy, particularly at low current levels, and also result in jerky diaphragm movement. It is known in the art to provide an automatic exposure control system which causes the exposure setting means to remain in continuous motion to prevent friction lock up. U.S. Pat. No. 3,427,941 issued to Lenard M. Metzger on Feb. 18, 1969 and assigned to the assignee of the instant invention discloses a continuously reciprocating drive for an exposure setting member wherein, by varying the amount of movement in each direction as a function of scene light, exposure may be adjusted automatically. A source of repetitive pulses continuously drives the exposure adjusting means alternately in opposite directions, thus preventing friction lock up. A portion of the pulses are controlled by a photoelectric device, so that the energy content of the controlled pulses is varied in accordance with the intensity of scene illumination monitored by the photoelectric device. In this manner the exposure adjustment is controlled as a function of scene light.

Although an arrangement of this type has proven quite satisfactory in eliminating lock up, the exposure setting member disclosed therein remains in its light regulating position after an exposure is made. As is known in the art, photoelectric devices do not respond quickly to decreases in scene light since their resistivity tends to remain relatively low at a level corresponding to a high scene light condition. As a result of this "memory" or hysteresis effect, the photoelectric device is not able to respond quickly and accurately to lower levels of scene light once they have been exposed to high levels of scene light. Such an effect tends to create inaccurate exposure values since the sensitivity of the photoelectric device is functionally related to the direction the light level changes between successive exposures.

Further, rather than driving the light regulating member in both directions electrically, as is done in the aforementioned Metzger patent, it is desirable to drive such a member electrically in only one direction, and mechanically in the other direction. For one reason a mechanical arrangement rather than an electrical circuit is generally a simpler and hence more reliable way to return the light regulating member to its light covering position. For a second reason, it is generally more economical to effect such an operation mechanically rather than electrically, which is an important design consideration in cameras built to be sold in the low to perhaps medium price range.

SUMMARY OF THE INVENTION

It is therefore an object of the instant invention to provide an automatic exposure control system which is of simple design and economical to manufacture.

It is further an object of the invention to provide an improved automatic exposure control system of the null position type which enables a light regulating member thereof to overcome friction lock-up.

It is a still further object of the instant invention to provide an automatic exposure control system of the aforementioned type in which the light sensitive portion of such a system is maintained in a darkened condition prior to camera actuation so as to provide a more accurate and consistent operational response upon exposure to scene light.

It is yet another object of the instant invention to provide an automatic exposure control system of the null position type in which the light regulating member reaches the null position when a mechanically induced bias force acting thereon is counterbalanced by an electrically induced drive force.

In accordance with the above objects, an automatic exposure control device having a movable member of the null position type for regulating the amount of light impinging on a photographic film comprises means for producing a drive signal having an energy content related to the intensity of scene light impinging on the film, means responsive to the drive signal for applying a drive force to the light regulating member to effect movement thereof relative to the film from a light blocking position into a light unblocking position, and means for applying a pressure to the light regulating member to exert a bias force thereon in a direction opposite to the drive force, the means for applying the drive force and the pressure applying means being arranged such that when the two forces are of an equal magnitude the light regulating member is in its null position.

The invention, and its objects and advantages, will become more apparent in the detailed description of a preferred embodiment presented below.

BRIEF DESCRIPTION OF THE DRAWINGS

In the detailed description of a preferred embodiment of the invention presented below, reference is made to the accompanying drawings, in which.

DESCRIPTION OF A PREFERRED EMBODIMENT

Because photographic cameras are well known, the present description will be directed in particular to camera elements forming part of, or cooperating more directly with, the exposure control device disclosed herein. It is to be understood camera elements not specifically shown or described may take various forms well known to those having skill in the art.

Figure 1:
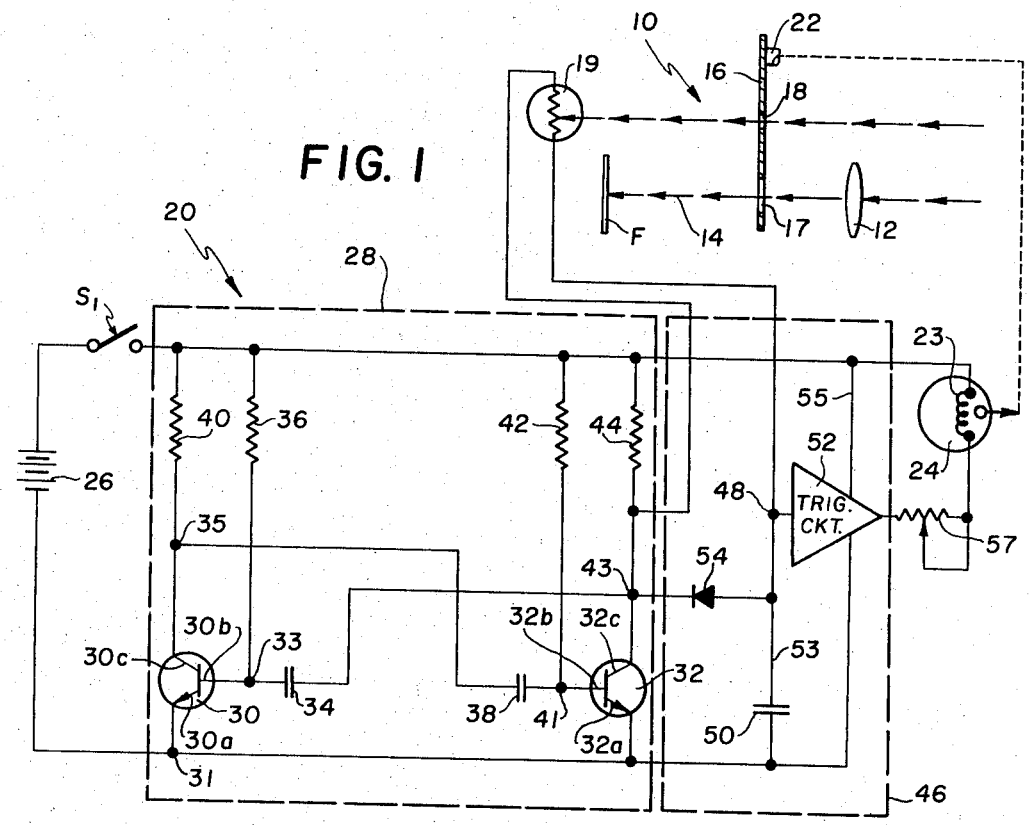
FIG. 1 is an elevational view of a portion of a camera having automatic exposure control apparatus in accordance with the teachings of the instant invention including a schematic diagram of a circuit for controlling such apparatus.

There is shown schematically in FIG. 1 a camera 10 having an objective lens 12 for receiving and directing light from a scene to be photographed along an optical axis 14 onto a photographic film F, which is located at the camera focal plane. Disposed between lens 12 and film F is a rotatably mounted light regulating member or aperture plate 16 of the type having a variable width aperture or slot 17 for controlling the amount of image bearing light reaching film F. Plate 16 while controlling the amount of scene light reaching film F, simultaneously controls by means of variable slot 18 the light impinging on a photosensitive element 19, which regulates the electrical network 20 also shown in FIG. 1.

Photosenstive element 19 may be any of a number of such elements conventionally used as light-measuring devices in photographic apparatus such as a photoconductive element or the like which has a resistance inversely proportional to the level of light incident thereon. As is known in the art, photosensitive elements of this type respond faster to light level changes going from a dark or dull condition to a bright light condition than when the light changes from a bright to a dark level. It is for this reason that it is desirable to maintain photoconductor 19 in a no-light environment during periods when camera 10 is not being used. To so do plate 16 is biased by suitable biasing means such as a spring 21, in a clockwise direction into a light blocking position, as shown by the dashed lines in FIG. 2, with respect to photoconductor 19 (and film F).

Plate 16 which is mounted for pivotal movement about a pivot 22 is mechanically coupled to a coil 23 of the type generally found in movable meters such as a galvanometer 24 or the like. Coils of this type are movable in response to a magnetic force of a localized magnetic field, which is produced by a current signal passing through the coil. When this signal is produced, coil 23 functions to drive aperture plate 16 in a direction opposite to the bias force produced by spring 21 into a light unblocking position with respect to photocell 19 (and film F).

Electrical network 20 includes a source of electrical power such as a battery 26 for supplying power through an actuatable control switch S1 to a conventional astable (free running) multivibrator 28 comprising control transistors 30 and 32, respectively. Switch S1 is closed by means known in the art such as a shutter release member (not shown) actuatable by a camera user for initiating the film exposure interval.

Control transistor 30 includes emitter, base, and collector electrodes 30a, 30b and 30c, respectively, electrode 30a being connected to electrical ground 31, electrode 30b being connected to a terminal 33 connecting one plate of a capacitor 34 to a biasing resistor 36, and electrode 30c being connected to a terminal 35 connecting one plate of a capacitor 38 to a resistor 40.

Control transistor 32 having emitter, base, and collector electrodes 32a, 32b and 32c, respectively is connected in a manner similar to that of transistor 30, with electrode 32a being connected to ground 31, electrode 32b being connected to a terminal 41, which connects the other plate of capacitor 38 to a biasing resistor 42, as shown, and collector electrode 32c being connected to a terminal 43, which connects the other plate of capacitor 34 as shown to a resistor 44.

Figure 3A:
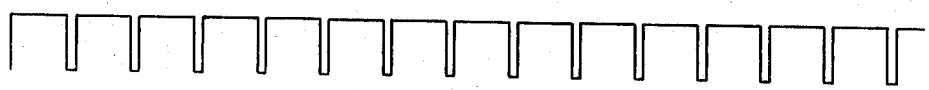
FIG. 3 illustrates for various scene light conditions signal waveforms which appear at particular terminals in the control circuit shown in FIG. 1.

When transistor 30 is turned ON, transistor 32 is turned OFF and vice versa. The duration of the ON time of transistor 30 (the OFF time of transistor 32) is determined by the product of the resistance of resistor 42 and the capacitance of capacitor 38 and the duration of the ON time of transistor 32 (the OFF time of transistor 30) is related to the product of resistor 36 and capacitor 34. The aforementioned multivibrator parameters are selectively varied such that the multivibrator output signal that appears at multivibrator output terminal 43 consists of a train of pulses, shown representatively in FIG. 3a, each pulse having a relatively long positive voltage portion followed by a relatively short zero voltage portion.

Responsive to the voltage signal at terminal 43 is a light sensitive control circuit 46 for positioning light regulating member 16 in its light unblocking position in accordance with the intensity of scene light. Control circuit 46 comprises photoconductor 19 connected between terminal 43 and a terminal 48, to which is also connected a timing capacitor 50 and the input of a voltage sensitive trigger circuit 52. Connected in parallel across photoconductor 19 is a diode 54 as shown.

Photoconductor 19 and capacitor 50 form an RC integrator circuit, denoted generally 53, which produces a generally periodic signal at terminal 48 in the form of a modified sawtooth waveform, each pulse in the sawtooth being representative of the integral of a one of the pulses in the multivibrator output signal appearing at terminal 43. Because of the aforementioned relationship between the resistance of photoconductor 19 and scene light intensity, the amplitude of each pulse in the signal at terminal 48 is related to the intensity of scene light.

Figure 3B:
Figure 3C:
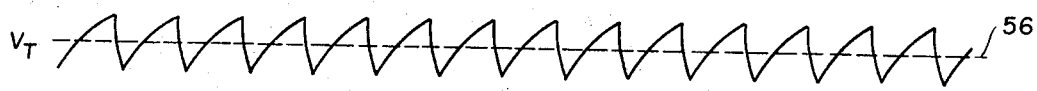
Figure 3D:
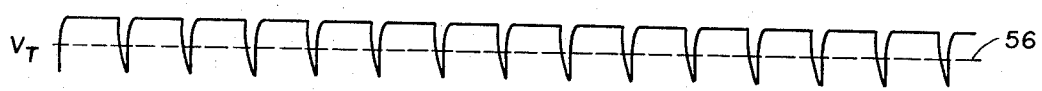

Examples of the type of signals which appear at terminal 48 are shown in FIGS. 3b through 3d for various levels of scene light intensity. Specifically, the voltage signal shown in FIG. 3b is for a dark or relatively low light condition, the signal shown at FIG. 3c is for an intermediate level of scene light, and the signal shown in FIG. 3d is that signal produced in a relatively bright light condition. The positive slopes and amplitude of the respective signals vary as shown because as the light level increases, the electrical resistance of photoconductor 19 decreases, thereby shortening the time constant of RC integrator 53, which condition permits capacitor 50 to be charged more rapidly. When the signal at terminal 43 drops to zero, that is, the zero voltage portion corresponding to when control transistor 32 is turned OFF, capacitor 50 discharges rapidly through diode 54, which condition is represented by the negative slopes of the curves illustrated in FIGS. 3b through 3d.

Trigger circuit 52 may be of the type known in the art as a comparator circuit and, more specifically, as a Schmitt trigger circuit or the like having a normally nonconducting input stage and an output stage of the type which is normally conducting. So long as the signal appearing at its input, that is, terminal 48, is below a predetermined percentage of its bias signal applied through signal path 55, the input stage of trigger circuit 52 is OFF while its output stage is ON. When its input signal exceeds this predetermined percentage, the output stage is turned OFF.

To more clearly illustrate the operation of trigger circuit 52, there is shown, for illustrative purposes only, superimposed on the curves of FIGS. 3b through 3d a curve 56 representative of the threshold or input trigger level $V_T$ for circuit 52. The threshold level has been selected as being, for example, approximately 50 percent of the output voltage of battery 26. It shall be understood that other threshold levels may be selected in accordance with practice and procedures well known in the art.

Figure 3E:
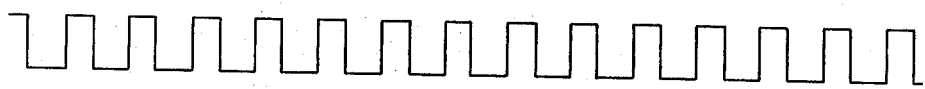
Figure 3F:

It can be seen that the input signal under a low light condition, that is the signal illustrated in FIG. 3b is inadequate for turning OFF the output stage of trigger circuit 52, but that at least a portion of the signals represented in FIGS. 3c and 3d are sufficient for turning the output thereof OFF. With the latter two input signals, the output signal from trigger circuit 52 is as shown in FIGS. 3e and 3f, respectively. It should be noted from the latter two figures that the greater the intensity of scene light impinging on photoconductor 19, the longer the output of circuit 52 is OFF but that under a low light condition, i.e., when its input is not turned ON, the magnitude of the output signal from circuit 52 is constant.

Figure 2:
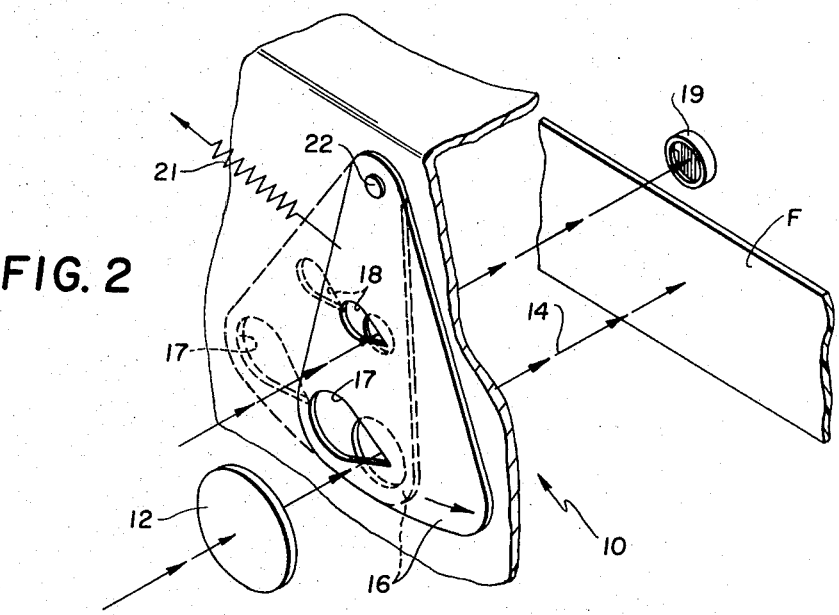
FIG. 2 is a perspective view of a portion of the camera shown in FIG. 1, illustrating an aperture plate of the exposure control apparatus in a light blocking position and in a particular light unblocking position.

More specifically, consider the operation of light sensitive circuit 46 when aperture plate 16 is positioned in its light blocking position, a condition obtained by spring 21 urging or biasing the plate in the clockwise direction to the position shown by the dashed lines of FIG. 2. In this position, the resistance of photoconductor 19 is very high, thereby creating a relatively long time constant for RC integrator circuit 53 so that the voltage signal appearing across capacitor 50 is of the type shown in FIG. 3b, that is, ineffective for turning ON the image stage of trigger circuit 52. When this condition exists, the output stage of circuit 52 is continuously ON and current flows through coil 23 and variable resistor 57 to ground 31. As this happens, the magnetic force associated with coil 23 functions to drive aperture plate 16 in the counterclockwise direction towards its light unblocking position counter to the bias force produced by spring 21. As this occurs, scene light is permitted to impinge on photoconductor 19 and film F, which condition functions to decrease the resistance of the photoconductor, thereby decreasing the time constant of RC integrator circuit 53. Correspondingly, capacitor 50 charges more rapidly. As additional light is permitted to impinge on photoconductor 19 capacitor 50 charges even more rapidly and the amplitude of the signal appearing at terminal 48 increases more rapidly. Eventually aperture plate 16 is moved relative to optical axis 14 such that the threshold voltage of trigger circuit 52 is reached and exceeded during the positive voltage portion of the pulse train appearing at terminal 43. When this happens, the output stage of trigger circuit 52 is turned OFF and current is prevented from flowing through coil 23, which condition causes the magnetic field produced by the coil to collapse and to thereby reduce the magnetic drive force associated therewith to zero during that portion of the cycle the threshold voltage is exceeded.

As photoconductor 19 (and film F) are exposed to increased amounts of scene light which are sufficient to turn the output of trigger circuit 52 OFF, the average magnetically induced drive force urging aperture plate 16 in the counterclockwise direction may still be greater than the continuous bias force produced by spring 21 (this, of course, depends on the brightness level of the scene light) so that plate 16 may continue to be driven such that apertures 17 and 18 are increasingly aligned with optical axis 14, thereby permitting increased amounts of scene light to impinge, respectively, on photoconductor 19 and film F. Eventually, however, aperture plate 16 is driven to a "null" position, that is, to a position wherein the output of trigger circuit 52 is turned OFF on the average a period of time such that the drive force produced by coil 23 is equal and opposite in direction to the continuous bias force produced by spring 21. In this position, film F is exposed to an amount of light adequate to obtain a high quality photograph. It will be understood that when aperture plate 16 is driven into its null position, the plate has a slight vibration due to the ON/OFF characteristic of the output of circuit 52. This enables the aperture plate to overcome static friction, yet does not perceptibly affect the picture-taking capability of the lens aperture.

Electrical power is removed from electrical network 20 when actuatable switch S1 is opened by means known in the art such as actuation of a shutter closing mechanism (not shown). When this occurs, current ceases flowing through coil 23 and aperture plate 16 is returned to its photoconductor covering position under the influence of spring 21. As a result, when camera 10 is not being utilized or the shutter is closed and the camera user is aiming the camera for another photograph, photoconductor 19 is covered and is in a darkened condition. When camera 10 is actuated, photoconductor 19 is always operated in an environment which subjects the photoconductor to increased amounts of scene light rather than from a bright to a low light environment. Since as mentioned previously herein the photoconductor response is faster when subjected to increased amounts of light, this ensures a rapid, as well as a more accurate response time since the photoconductor is exposed to light pattern changes which are always variable in the same direction.

The invention has been described in detail with particular reference to a preferred embodiment thereof, but it will be understood that variations and modifica-

I claim:

1. In a camera having a film exposure plane and having a photosensitive element with a parameter which varies between a first level and a second level as a function of the amount of light impinging on said element, the improvement comprising:
   a. an apertured light-regulating member movable along a path between (1) a normal rest position in which scene light is blocked from said film exposure plane and said photosensitive element and (2) a maximum apertured light-unblocking position in which scene light can be directed toward said exposure plane while a proportional amount of light can be directed onto said photosensitive element;
   b. spring means for creating a bias force urging said light-regulating member toward said normal rest position;
   c. a galvanometer having a movable coil coupled to said light-regulating member, said coil being responsive to an electrical signal and being effective to apply to said light-regulating member a drive force proportional to the energy content of such a signal in opposition to said bias force, said galvanometer and said spring means being located with respect to said light-regulating member to effect movement of said member from said rest position toward said maximum apertured light-unblocking position when an electrical signal is applied to said coil; and
   d. circuit means, including said photosensitive element, for providing to said galvanometer a time-invariant electrical signal when said parameter is at its first level, to thereby effect continuous relatively rapid movement of said light-regulating member, said circuit means further including means for periodically interrupting said time-invariant signal to produce a pulsed signal when said parameter is at its second level, to thereby effect intermittent movement of said light-regulating member.

2. In a camera having a film exposure plane and a photosensitive element with a parameter having a magnitude which varies over (1) a first range of values when the difference between the amount of projected scene light impinging on said element and a predetermined operational level of scene light is greater than a particular amount and (2) a second range of values when said difference is less than said particular amount, the improvement comprising:
   a. an apertured vane member movable through a range of positions between (1) a normal light-blocking position in which scene light is blocked from said film exposure plane and said photosensitive element and (2) a maximum apertured light-unblocking position in which scene light can be projected toward said film exposure plane while at the same time a proportional amount of scene light can be projected onto said photosensitive element;
   b. spring means for creating a bias force continuously urging said vane member toward said light-blocking position;
   c. circuit means, including said photosensitive element, for producing a first electrical signal which is constant when said parameter is within said first range of values, said circuit means further including means for periodically interrupting said first electrical signal when said parameter is within said second range of values to produce a second signal which is pulsed and which comprises a series of variable width pulses functionally related to said parameter; and
   d. a galvanometer having a movable coil interconnecting said circuit means and said vane member, said coil being responsive to an electrical signal and being effective to apply to said vane member a drive force proportional to the energy content of such a signal in opposition to said bias force, said galvanometer and said spring means being located with respect to said vane member to effect movement of said vane from said light-blocking position toward said maximum apertured light-unblocking position when said electrical signal is applied to said coil, said movement being characterized as continuous and relatively rapid when said first electrical signal is applied to said coil and as being pulsating when said second electrical signal is applied thereto, said drive force being generally equal to and counter-balanced by said bias force when said vane member reaches its operational position.

3. In a camera having a film exposure plane and a photosensitive element with a parameter which varies between a first level and a second level as a function of the amount of light impinging on said element, the improvement comprising:
   a. an apertured light-regulating member movable through a range of positions between (1) a normal rest position in which scene light is blocked from said film exposure plane and said photosensitive element and (2) a maximum apertured light-unblocking position in which scene light can be directed toward said exposure plane while a proportional amount of light can be projected onto said photosensitive element;
   b. spring means for creating a bias force urging said light-regulating member toward said light-blocking position;
   c. transducer means having a movable output member coupled to said light-regulating member, said output member being responsive to an electrical signal and being effective to apply to said light-regulating member a drive force proportional to the energy content of such a signal in a direction opposite to said bias force so as to effect movement of said light-regulating member from said rest position into a particular operational, light-unblocking position when an electrical signal is applied to said output member; and
   d. circuit means, including said photosensitive element, for providing to said transducer means a time-invariant electrical signal when said parameter is at its first level, to thereby effect continuous relatively rapid movement of said light-regulating member, said circuit means further including switching means for interrupting said time-invariant signal at a rate functionally related to the magnitude of said parameter when said parameter is at its second level to produce a pulsed electrical signal to thereby effect intermittent movement of said light-regulating member, said circuit means in combination with said spring means being adapted to create limited vibratory movement of said light-regulating member when in said particular operational position.

4. In a camera having a film exposure plane and a photosensitive element with a parameter having a magnitude which varies over (1) a first range of values when the scene light impinging on said element is less than a predetermined level and (2) a second range of values when the impinging light is greater than said predetermined level, the improvement comprising:
   a. an apertured light-regulating member movable along an operational path between (1) a normal rest position in which scene light is blocked from said film plane and said photosensitive element and (2) a maximum apertured light-unblocking position in which scene light is projected toward said film exposure plane while a proportional amount of scene light is projected onto said photosensitive element;
   b. spring means for creating a bias force urging said light-regulating member toward said light-blocking position;
   c. circuit means, including said photosensitive element, for producing a first electrical signal which is constant when said parameter is within said first range of values, said circuit means further including means for periodically interrupting said first electrical signal when said parameter is within said second range of values to produce a second electrical signal which is pulsed at a rate functionally related to the magnitude of said parameter; and
   d. a galvanometer having a movable coil interconnecting said circuit means and said light-regulating member, said coil being responsive to an electrical signal and being effective to apply a drive force to said light-regulating member in a direction opposed to said bias force to effect movement of said light-regulating member from said rest position along said operational path toward said maximum apertured position into a particular light-unblocking position, said galvanometer and said spring means being constructed and arranged with respect to each other such that said light-regulating member movement is relatively rapid and continuous when said first electrical signal is applied to said coil and is oscillatory when said second signal is applied thereto, whereby limited pulsating movement of said light-regulating member is created when in said particular light-unblocking position.

* * * * *